US011067804B2

(12) United States Patent
Yokoyama

(10) Patent No.: US 11,067,804 B2
(45) Date of Patent: Jul. 20, 2021

(54) VIRTUAL IMAGE DISPLAY DEVICE

(71) Applicant: SEIKO EPSON CORPORATION, Tokyo (JP)

(72) Inventor: Osamu Yokoyama, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 202 days.

(21) Appl. No.: 16/282,822

(22) Filed: Feb. 22, 2019

(65) Prior Publication Data

US 2019/0265479 A1    Aug. 29, 2019

(30) Foreign Application Priority Data

Feb. 23, 2018   (JP) .............................. JP2018-031372

(51) Int. Cl.
| | | |
|---|---|---|
| *G02B 27/14* | (2006.01) | |
| *G02B 27/01* | (2006.01) | |
| *G02B 5/10* | (2006.01) | |
| *G02B 5/04* | (2006.01) | |
| *G02B 17/00* | (2006.01) | |

(52) U.S. Cl.
CPC .......... *G02B 27/0172* (2013.01); *G02B 5/04* (2013.01); *G02B 5/10* (2013.01); *G02B 17/008* (2013.01)

(58) Field of Classification Search
CPC ................................................ G02B 27/0172
USPC ................................................ 359/630, 631
See application file for complete search history.

(56) References Cited

U.S. PATENT DOCUMENTS

| | | | |
|---|---|---|---|
| 2011/0051076 A1 | 3/2011 | Sugihara et al. | |
| 2014/0293434 A1* | 10/2014 | Cheng ................... | G02B 30/26 |
| | | | 359/630 |
| 2017/0242252 A1 | 8/2017 | Ide et al. | |
| 2017/0276946 A1 | 9/2017 | Yokoyama | |

FOREIGN PATENT DOCUMENTS

| | | |
|---|---|---|
| CN | 103995355 A | 8/2014 |
| JP | 2011-053367 A | 3/2011 |
| JP | 2012-208193 A | 10/2012 |
| JP | 2016-071309 A | 5/2016 |
| JP | 2017-173573 A | 9/2017 |

* cited by examiner

*Primary Examiner* — James C. Jones
(74) *Attorney, Agent, or Firm* — Oliff PLC

(57) ABSTRACT

A virtual image display device of the invention includes an image display element configured to emit image light, a relay optical system configured to generate an intermediate image of the image light emitted from the image display element, and an ocular optical element configured to reflect the intermediate image toward a position assumed to be a position of an eye of an observer to generate an enlarged virtual image. The relay optical system includes a prism, and the prism includes a first bending surface including a bending surface and serving as an incident surface, a second bending surface including a bending surface and serving as an emission surface, and a reflecting surface configured to reflect, toward the second bending surface, the image light incident from the first bending surface.

8 Claims, 13 Drawing Sheets

VIRTUAL IMAGE DISPLAY DEVICE

BACKGROUND

1. Technical Field

The present invention relates to a virtual image display device.

2. Related Art

A head-mounted display (HMD) is known as a display device configured to directly emit image light onto a retina of a pupil in order to allow a user to visually recognize an image.

A head-mounted display typically includes an image display element for generating image light, a relay optical system for generating an intermediate image of the image light emitted from the image display element, and an ocular optical element for reflecting (deflecting), toward a position assumed to be a position of the eye of the observer, i.e., a retina, an enlarged virtual image of the intermediate image. Such type of head-mounted display allows a user to visually recognize both a view of the external environment and the enlarged virtual image generated from the image light passed through the relay optical system simultaneously, for example.

In such type of head-mounted display, the image display element is disposed on a side of the head of the observer and the ocular optical element is disposed in front of the eye (pupil), for example. In addition, the relay optical system is disposed between the image display element and the ocular optical element, i.e., between the side surface of the head (side of head) and the region in front of the eye, for example.

Thus, it is desirable for the relay optical system to be disposed along the head of the observer between the side surface of the head and the region in front of the eye so as to reduce a protrusion amount from the head and provide the head-mounted display with an excellent appearance, as well as to have an ability to generate a high resolution enlarged virtual image.

JP-A-2012-208193 proposes an eccentric prism used in a relay optical system. JP-A-2012-208193 proposes achieving a compact optical system by deflecting an optical path by using the eccentric prism, and sharing load for correcting eccentric aberration in an ocular optical element including a back surface mirror by increasing a magnification ratio of an intermediate image in the relay optical system.

However, as a matter of fact, the eccentric prism used in the relay optical system disclosed in JP-A-2012-208193 does not provide an excellent appearance due to insufficient reduction in a protrusion amount from the head, and further, sufficient correction for aberration.

SUMMARY

The invention has been made to address the above-described issues, and can be realized as the following application examples.

A virtual image display device according to an application example of the invention includes an image display element configured to emit image light, a relay optical system configured to generate an intermediate image of the image light emitted from the image display element, and an ocular optical element configured to reflect the intermediate image toward a position assumed to be a position of an eye of an observer to generate an enlarged virtual image. The relay optical system includes a prism, and the prism includes a first bending surface including a bending surface and serving as an incident surface, a second bending surface including a bending surface and serving as an emission surface, and a reflecting surface configured to reflect, toward the second bending surface, the image light incident from the first bending surface.

In a virtual image display device according to an application example of the invention, it is preferable that the relay optical system further includes at least one lens and the prism is positioned closest to the ocular optical element in the relay optical system.

In a virtual image display device according to an application example of the invention, it is preferable that the image display element is disposed at a position assumed to be a position of a side of a head of the observer, the ocular optical element is disposed at a position assumed to be a position in front of the eye of the observer, the relay optical system is disposed between the image display element and the ocular optical element, and the image display element is configured to emit the image light along the position assumed to be the position of the side of the head to make the image light incident on the relay optical system.

In a virtual image display device according to an application example of the invention, it is preferable that the reflecting surface includes a flat surface.

In a virtual image display device according to an application example of the invention, it is preferable that the prism includes an opposite surface at a position opposing to the reflecting surface, the opposite surface including a flat surface.

In a virtual image display device according to an application example of the invention, it is preferable that the prism includes an opposite surface at a position opposing to the reflecting surface, the opposite surface being a concave surface including two flat surfaces.

In a virtual image display device according to an application example of the invention, it is preferable that the prism includes an opposite surface at a position opposing to the reflecting surface, the opposite surface including a curved concave surface.

In a virtual image display device according to an application example of the invention, it is preferable that the ocular optical element includes a prism member including a transparent optical medium and a concave surface mirror covering a part of the prism member, the prism member includes a flat surface facing the position assumed to be the position of the eye of the observer and a curved surface on the opposite side with respect to the position assumed to be the position of the eye, the curved surface including a protruding curved surface shape protruding away from the flat surface facing the position assumed to be the position of the eye, and the concave surface mirror covers the curved surface.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, the virtual image display device of the invention will be described in connection with preferable exemplary embodiments illustrated in accompanied drawings.

Note that an example in which the virtual image display device (image display device) of the invention is applied to a head-mounted display (HMD) will be described below.

Figure 1:
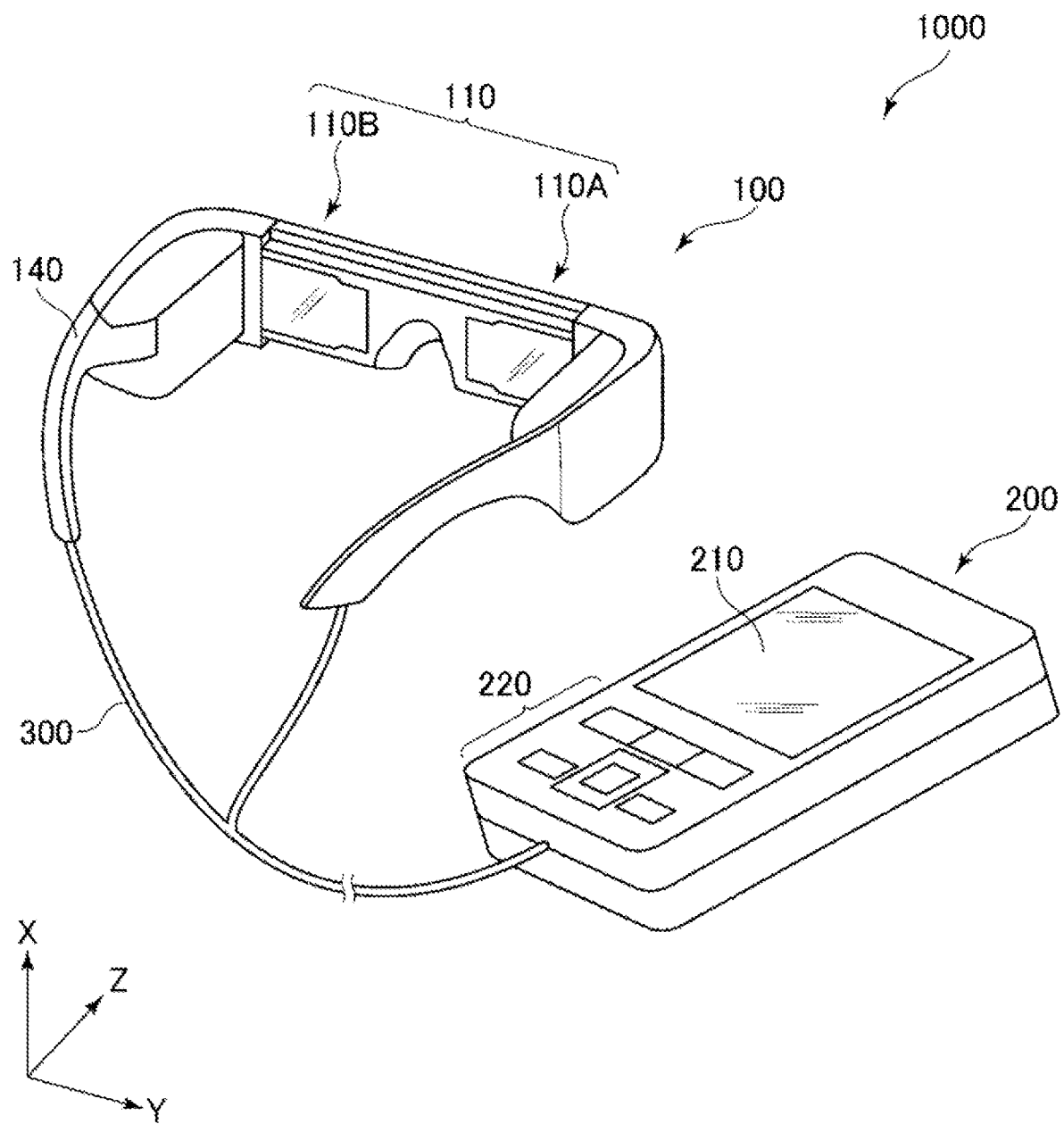
FIG. 1 is a schematic perspective view illustrating an exemplary embodiment as a whole, in which a virtual image display device of the present invention is applied to a head-mounted display (HMD).

FIG. 1 is a schematic perspective view illustrating an exemplary embodiment as a whole, in which a virtual image display device of the invention is applied to a head-mounted display (HMD).

A head-mounted display 1000 (HMD) includes, as illustrated in FIG. 1, a main unit 100 having an eyeglasses-like shape and a control unit 200 (controller) having a size suitable to be hold by a hand of a user.

In the present exemplary embodiment, the main unit 100 and the control unit 200 is connected by a cable 300 such that wired communication is available. Further, the main unit 100 and the control unit 200 receives or sends an image signal or control signal via the cable 300. Note that, to the extent that the main unit 100 and the control unit 200 are communicably connected, another communication method such as wireless communication may be employed, rather than the wired communication illustrated in FIG. 1.

The control unit 200 includes an operation unit 210 and an operation button 220. A user performs operational input to the operation unit 210 or operation button 220 of the control unit 200 to give instructions to various units included in the main unit 100.

During use, the main unit 100 is mounted on the head of the user in a similar way to wearing eyeglasses. Thus, the main unit 100 includes a frame 140 and an image display unit 110 contained in the frame 140.

The image display unit 110 includes an image display unit 110A for the right eye that is contained in the right section of the frame 140 and configured to generate image light of an image for the right eye and emit the image light to the right eye of the observer, and an image display unit 110B for the left eye that is contained in the left section of the frame 140 and configured to generate image light of an image for the left eye and emit the image light to the left eye of the observer.

The image display unit 110A contained in the right section of the frame 140 and the image display unit 110B contained in the left section of the frame 140 have similar configurations, and the arrangement of components in the image display unit 110A and the arrangement of components in the image display unit 110B are left-right symmetric to each other. Thus, hereinafter, the image display unit 110A will be described as a representation, and description of the image display unit 110B will be omitted.

First Exemplary Embodiment

Firstly, First Exemplary Embodiment of the image display unit 110A will be described.

Figure 2:
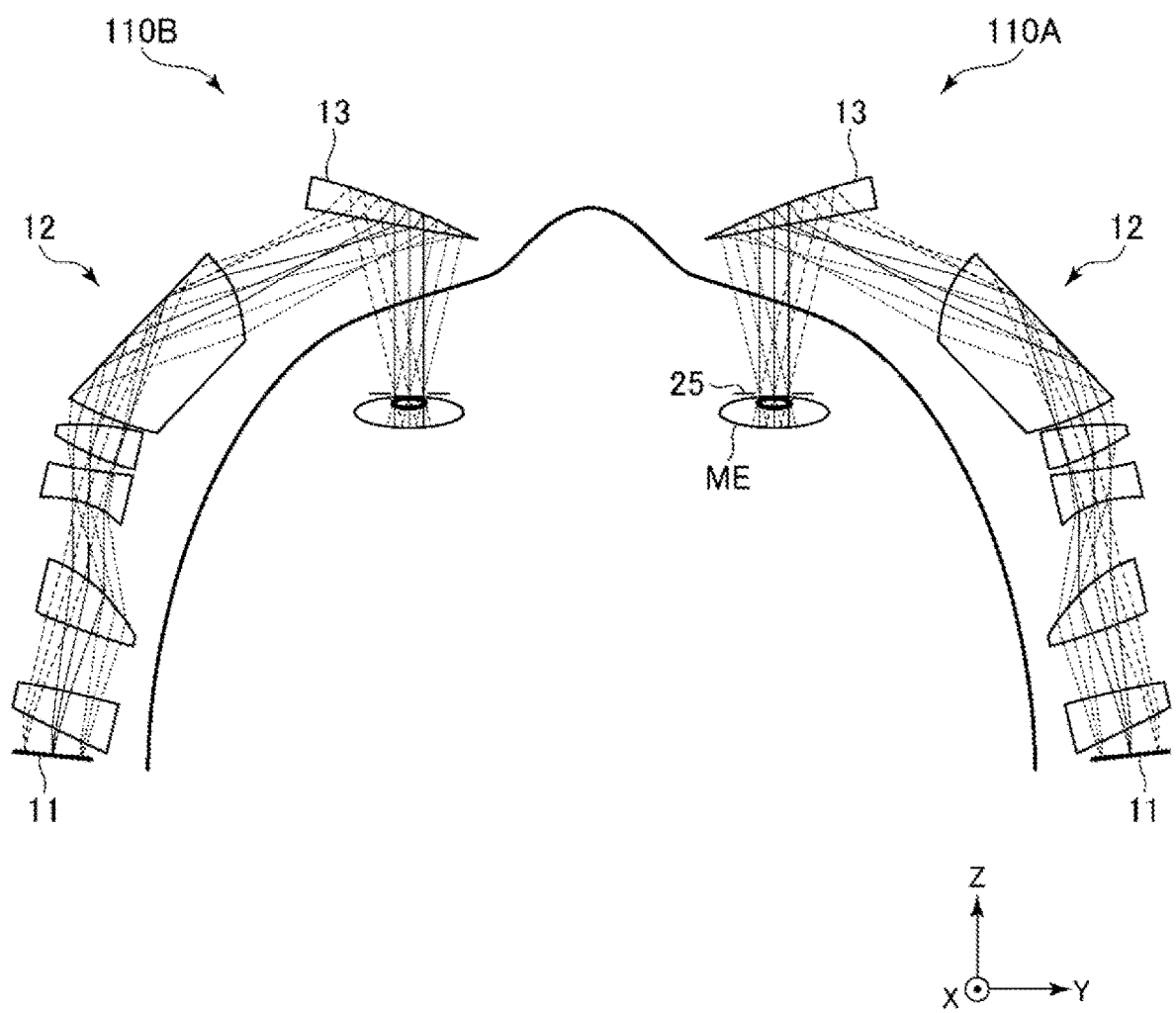
FIG. 2 is a schematic plan view generally illustrating a configuration of First Exemplary Embodiment of an image display unit included in the head-mounted display illustrated in FIG. 1, in which the HMD is mounted on the observer.
Figure 3:
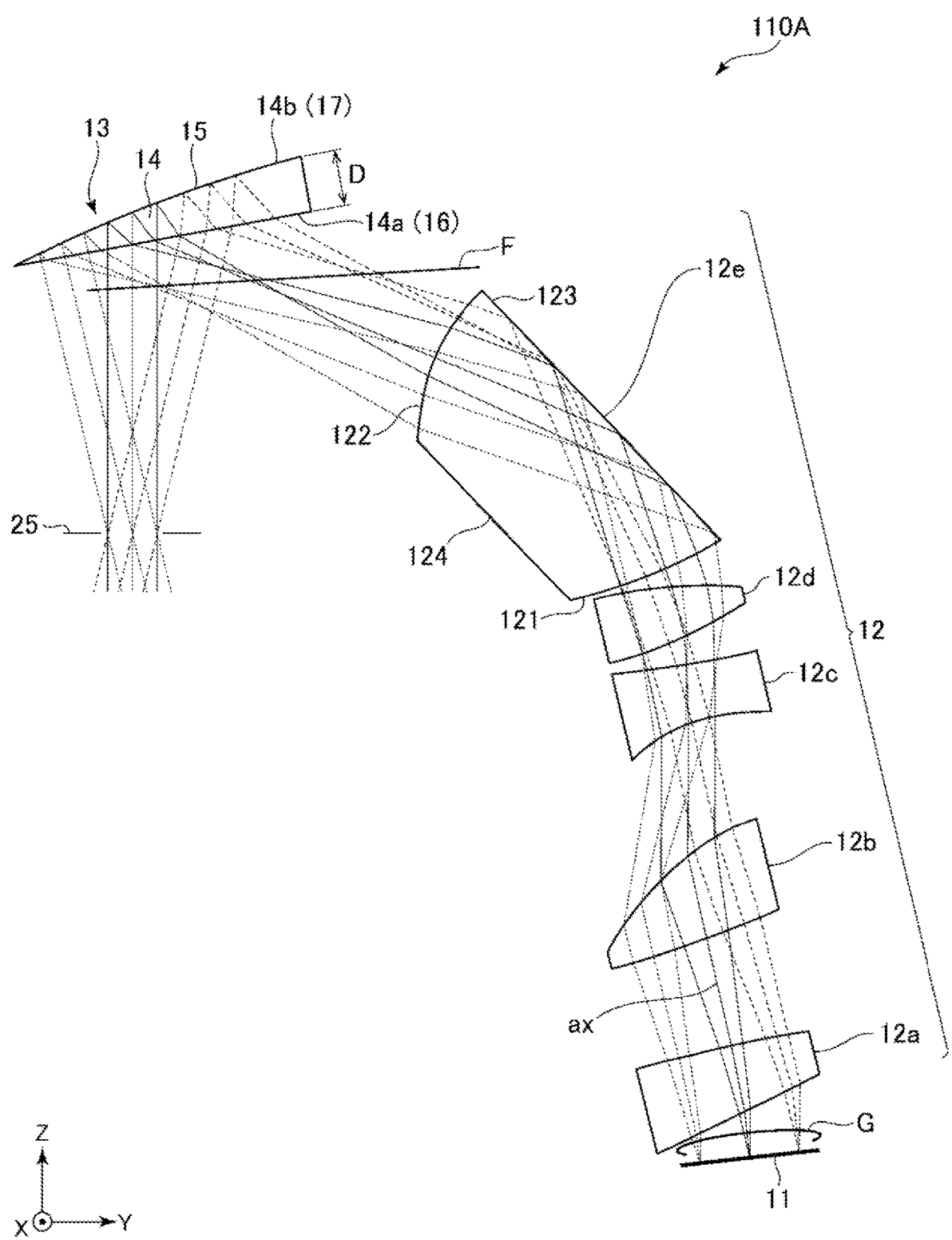
FIG. 3 is an enlarged plan view of an arrangement in the right section of the image display unit illustrated in FIG. 2.
Figure 4:
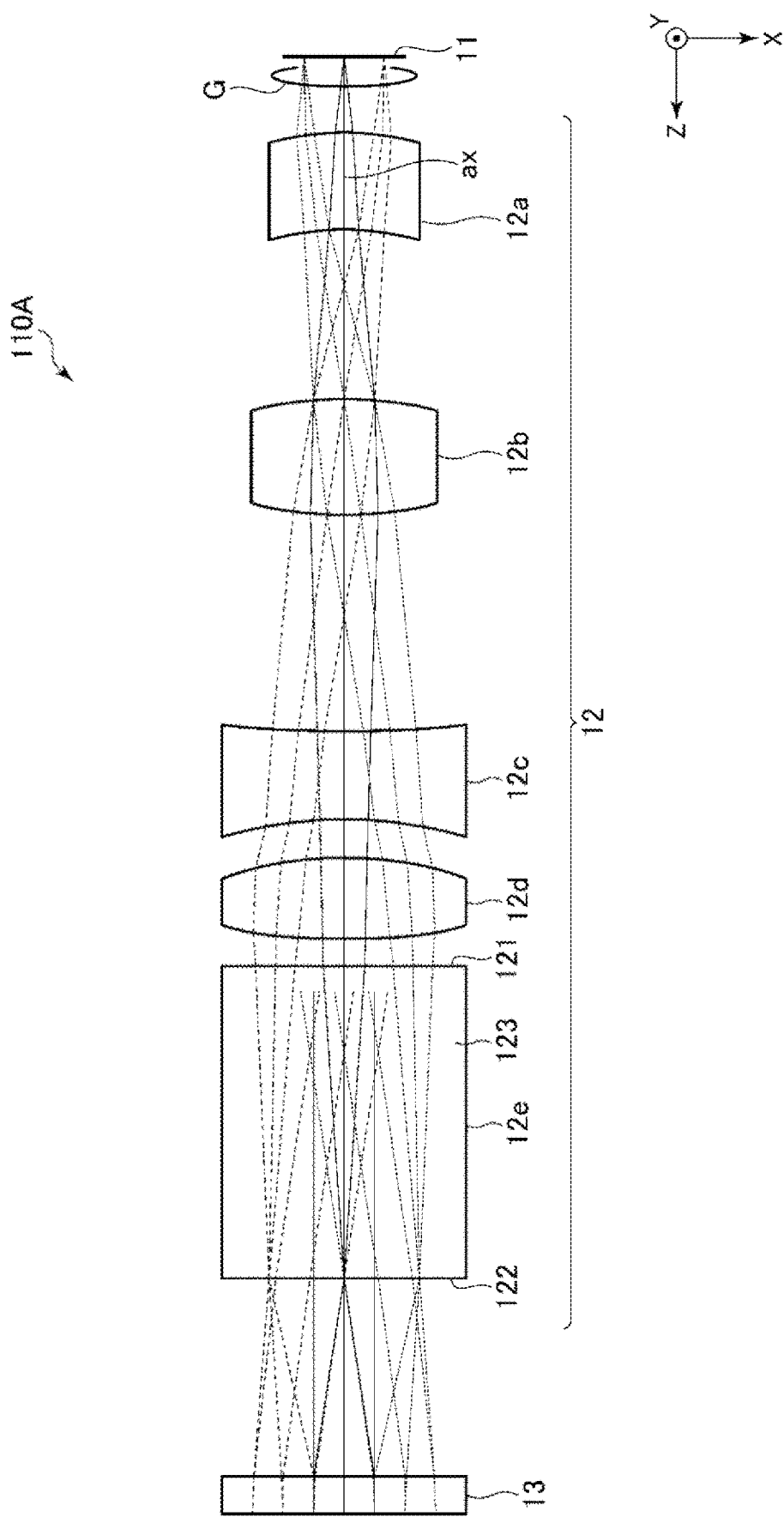
FIG. 4 is an enlarged side view of the arrangement in the right section of the image display unit illustrated in FIG. 2.
Figure 5:
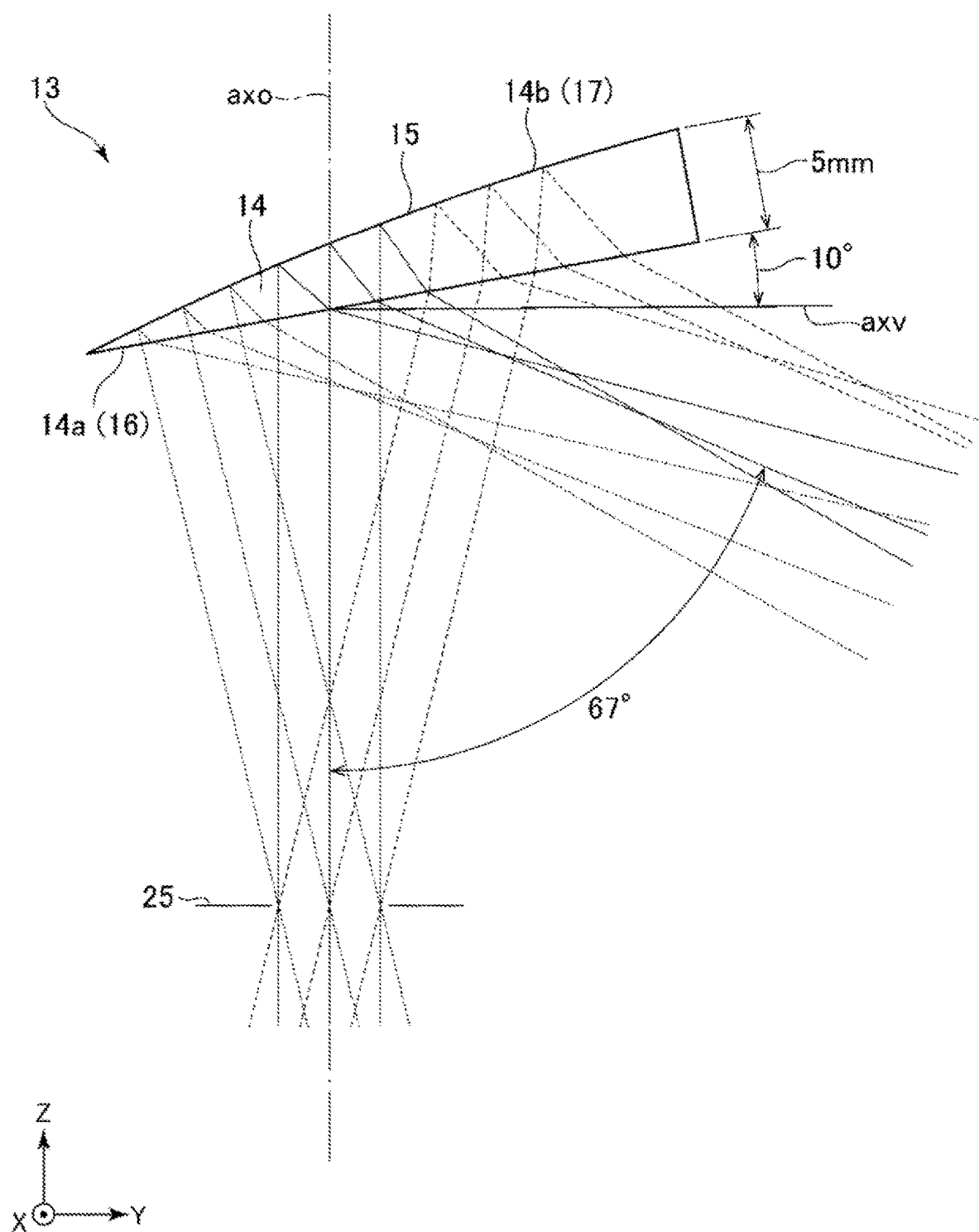
FIG. 5 is an enlarged plan view of an ocular optical element included in the image display unit illustrated in FIG. 4.
Figure 12:
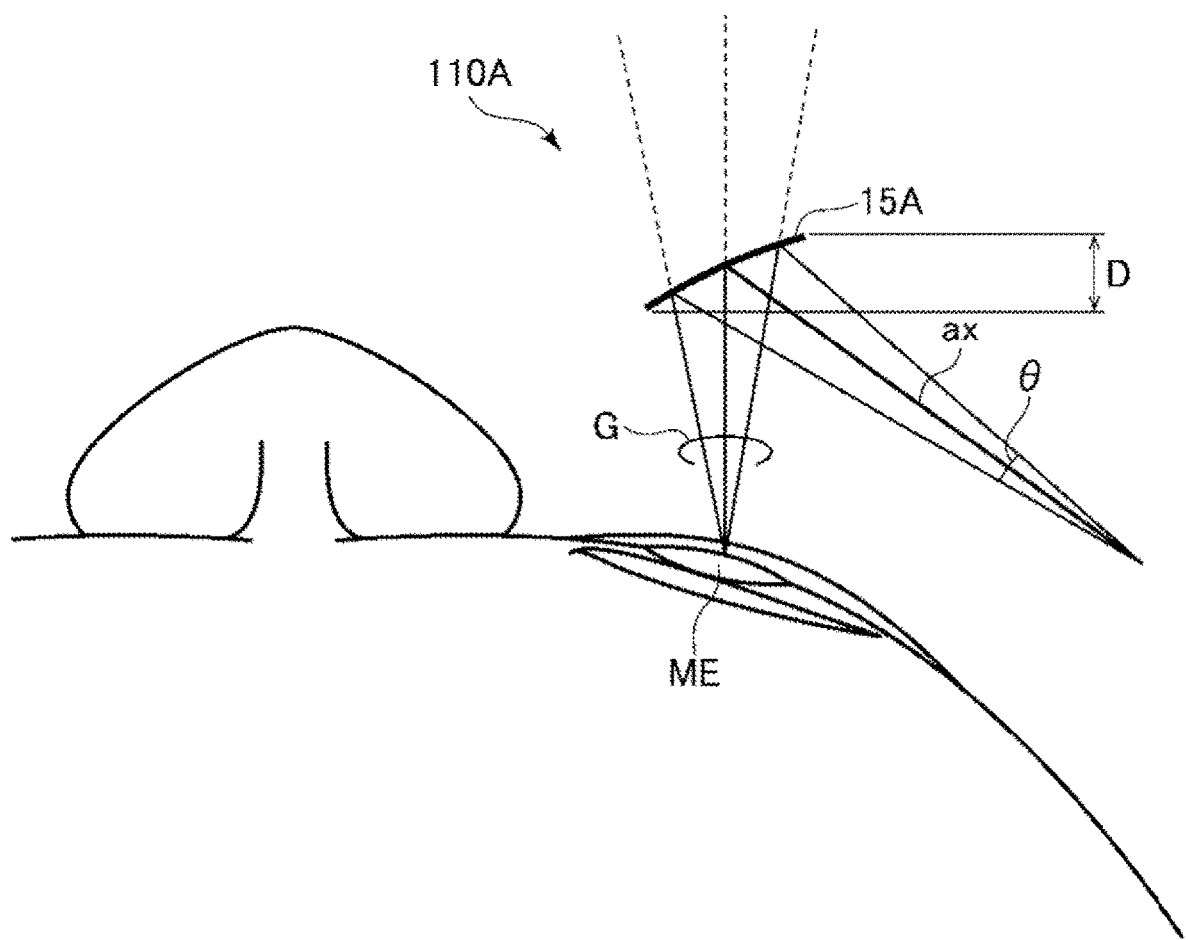
FIG. 12 is a partially enlarged plan view of a right section of an image display unit included in an image display unit of a typical HMD.
Figure 13:
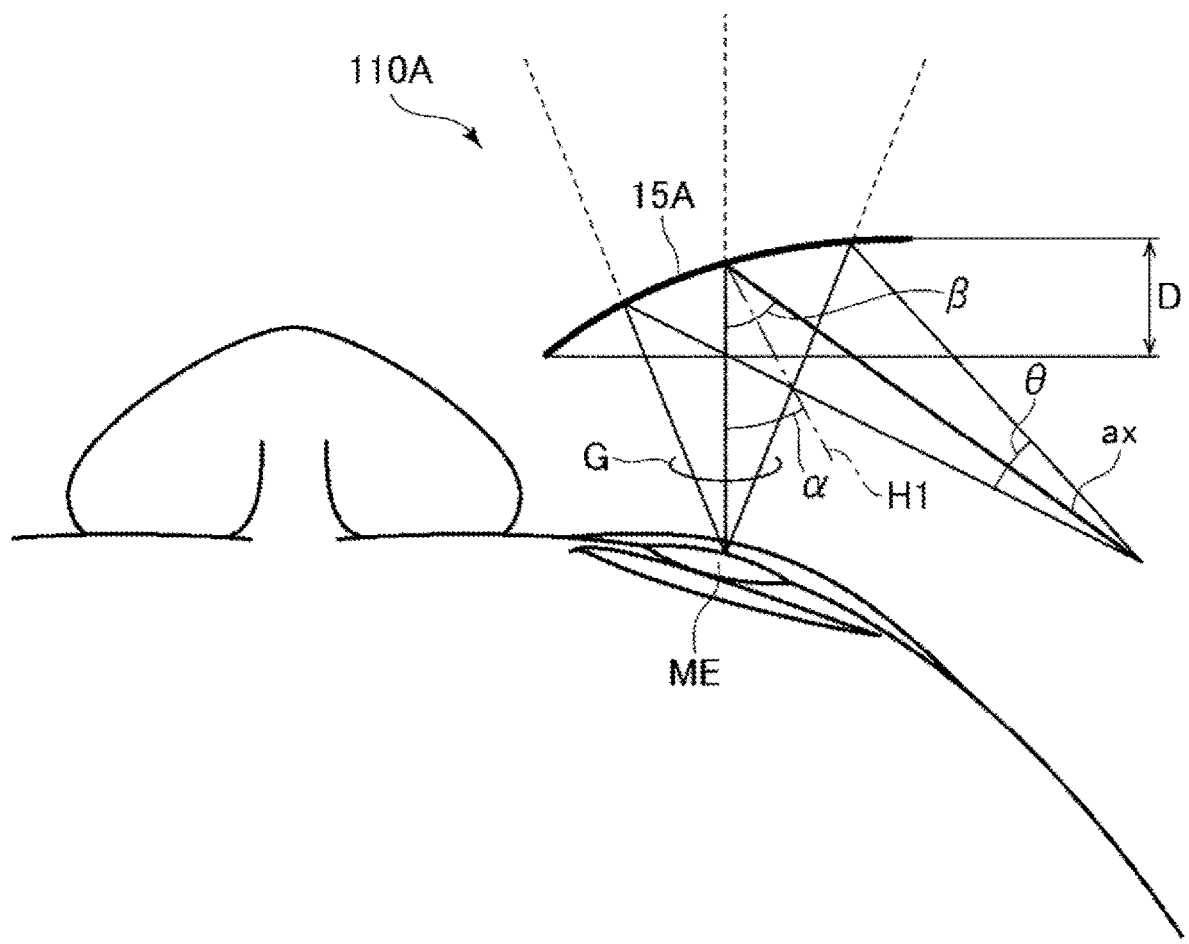
FIG. 13 is a partially enlarged plan view of a right section of an image display unit included in an image display unit of a typical HMD.

FIG. 2 is a schematic plan view generally illustrating a configuration of First Exemplary Embodiment of an image display unit included in the head-mounted display illustrated in FIG. 1, in which the HMD is mounted on the observer. FIGS. 3 and 4 are enlarged views of an arrangement in the right section of the image display unit illustrated in FIG. 2. FIG. 5 is an enlarged plan view of an ocular optical element included in the image display unit illustrated in FIG. 4. FIGS. 12 and 13 are partially enlarged plan views of a right section of an image display unit included in an image display unit of a typical HMD. Note that the description will continue assuming that the upward direction in FIG. 2 is defined as "forward (Z direction)", the downward direction is defined as "backward (−Z direction)", a direction from the plane of the figure toward a reader is defined as "upward (X direction)", a direction from the reader toward the plane of the figure is defined as "downward (−X direction)", the right direction is defined as "rightward (Y direction)", and the left direction is defined as "leftward (−Y direction)", for convenience in the description. In other words, the description will continue assuming that the direction in which a relay optical system 12 described below is arranged is "±Z direction", the width direction of the relay optical system 12 is "±Y direction", and the height direction of the relay optical system 12 is "±X direction".

As illustrated in FIGS. 2 to 4, the image display unit 110A includes an image display element 11, the relay optical system 12 (light-guiding optical system), and an ocular optical element 13 (prism optical element).

Note that, in FIGS. 3 and 4, a path extending through the center of a pupil of the eye ME of the observer and along which a ray of light forming a central angle of view of an observed image travels is defined as an optical axis ax.

The image display element 11 is configured to emit image light G including image information. In the present exemplary embodiment, the image display element 11 is disposed on the right side surface of the head of the observer so as to face (oppose to) the relay optical system 12 disposed between the image display element 11 and the ocular optical element 13. The image display element 11 is configured to emit the image light G toward the relay optical system 12, i.e., along the side of the head of the observer to make the image light G incident on the relay optical system 12.

In the present exemplary embodiment, the image display element 11 includes a two-dimensional image display element, for example, a liquid crystal display element illuminated by a backlight, an organic EL display element, or the like.

However, the image display element 11 is not limited to such a two-dimensional image display element, and may include a scanning type image display element in which an image is generated by scanning by using laser light emitted from a laser light source.

The ocular optical element 13 (prism optical element) is configured to deflect (reflect) the image light G emitted from the image display element 11 and passed through the relay optical system 12 and guide the image light G to the right eye ME of the observer (right eye) so that an image is displayed on the retina of the eye ME (right eye). The ocular optical element 13 is disposed in front of the right eye ME of the observer (right eye).

The ocular optical element 13 includes a prism member (first prism member) and a concave surface mirror 15 covering a part of the prism member 14.

The prism member 14 includes an optical medium such as a transparent optical resin or an optical glass, for example, and includes a surface 14a (surface on the eye ME side) and a surface 14b (surface opposite to the eye ME side). The surface 14a (surface on the eye ME side) includes a light refracting surface 16 (first light refracting surface), while the surface 14b (surface opposite to the eye ME side) includes a curved surface 17. From among these surfaces, the light refracting surface 16 includes a flat surface, while the curved surface 17 includes a protruding curved surface protruding in a direction away from the light refracting surface 16.

In the prism member 14 having such a configuration, the light refracting surface 16 refracts (deflects) the image light G to guide the image light G to the concave surface mirror 15. In this refraction, the light refracting surface 16 refracts the image light G such that the direction of the optical axis ax deviates outward with respect to the observer.

The concave surface mirror 15 is formed by vapor deposition of a metal coating onto the curved surface 17 so that the curved surface 17 is covered by the concave surface mirror 15, for example. Thus, the concave surface mirror 15 has a curved shape imitating the shape of the curved surface 17. In the present exemplary embodiment, the concave surface mirror 15 serves as a concave surface mirror as an ocular optical system, and excellently guide, to the eye ME of the observer, the image light G emitted from the image display element 11 by reflecting the image light G. More specifically, the concave surface mirror 15 focuses light from an intermediate image F to form an exit pupil 25 in the vicinity of the pupil of the eye ME of the observer. As a result, the observer can see an enlarged virtual image through the ocular optical element 13. Note that, since the concave surface mirror 15 in the present exemplary embodiment is not light transmissive, a head-mounted display 1000 including the ocular optical element 13 including the concave surface mirror 15 is applied to a reflective type head-mounted display.

The image light G reflected on the concave surface mirror 15 is refracted by the light refracting surface 16 when emitted from the prism member 14, thereby entering the eye ME of the observer. Thus, the observer can visually recognize an enlarged virtual image through the concave surface mirror 15.

By the way, wider angle of view in a head-mounted display has been demanded recently.

Thus, problems found in widening angle of view is described with reference to a case where the ocular optical element is formed only by the concave surface mirror 15A.

Note that FIG. 12 illustrates a case of narrowing angle of view in the image display unit 110A included in the head-mounted display and FIG. 13 illustrates a case of widening angle of view in the image display unit 110A.

An ocular optical element included in the image display unit 110A of a typical head-mounted display is configured to guide the image light G to the eye ME of the observer by using only the concave surface mirror 15A, and on this point, it differs from the ocular optical element 13 included in the image display unit 110A of the head-mounted display 1000 described in the present exemplary embodiment.

Note that, in FIGS. 12 and 13, a path extending through the center of a pupil of the eye ME of the observer and along which a ray of light forming a central angle of view of an observed image light G travels is defined as an optical axis ax.

Firstly, as illustrated in FIG. 12, the curved surface of the concave surface mirror 15A is disposed so as to approach the face of the observer as it goes close to the nose, and be further away from the face as it goes close to the ear. Therefore, as the angle of view θ becomes larger, a protrusion amount of the concave surface mirror 15A (hereinafter, referred to as "mirror protrusion amount D") becomes greater, as illustrated in FIG. 12. As such, the large mirror protrusion amount D results in undesirable impairment of the appearance design.

Thus, it is possible to consider reducing the mirror protrusion amount D while keeping the angle of view θ unchanged. As an approach to reduction of the mirror protrusion amount D while keeping the angle of view θ unchanged, it is possible to propose to reduce an inclination angle α of the concave surface mirror 15A. As illustrated in FIG. 13, the inclination angle α herein is an angle between the normal line of the mirror plane H1 of the concave surface mirror 15A and the optical axis ax.

However, as seen from FIG. 13, as the inclination angle α becomes smaller, the deflection angle β of the optical axis ax, when deflected by the concave surface mirror 15A, becomes smaller. Therefore, a problem of contact between the image display element 11 or the relay optical system 12 and the head of the observer may occur, because they come close to each other.

In this regard, in the head-mounted display 1000 according to the present exemplary embodiment, the image light G is refracted by the light refracting surface 16 included in the ocular optical element 13. Specifically, the optical axis ax is deflected by refracting the image light G by using the light refracting surface 16, and thus, it is possible to dispose the image display element 11 and the relay optical system 12 at a position that does not contact the head of the observer, even when the inclination angle α is decreased in order to reduce the above-described mirror protrusion amount D.

More specifically, even when the inclination angle α in FIG. 13 needs to be set at 30 degrees, for example, by replacing the concave surface mirror 15A with the ocular optical element 13, the inclination angle α can be decreased to about 15 degrees. Furthermore, even when the deflection angle β in FIG. 13 is set at about 60 degrees, it is possible to avoid the image display element 11 and the relay optical system 12 from contacting the head of the observer.

Therefore, for example, in a case where a virtual image having a horizontal angle of view of 40 degrees is observable, a configuration in which only the concave surface mirror 15A is used, as illustrated in FIG. 12, requires a mirror protrusion amount D of about 17 mm, while a configuration in which the ocular optical element 13 is used can reduce the mirror protrusion amount D to about 10 mm.

Furthermore, as illustrated in FIG. 5, when a visual axis axo extending through the center of the exit pupil 25 is defined and taken into account, and, for example, when the refractive index of the prism member 14 is 1.74, an inclination angle of the surface 14a, that is an eye-side flat surface, with respect to a plane axv orthogonal to the visual axis is 10 degrees, and an inclination angle of the concave surface mirror 15A at the position of the visual axis axo is about 20 degrees, the deflection angle of the incident light parallel to the visual axis axo is about 67 degrees and the light travels in an outward direction with respect to the face.

Furthermore, when the angle of view in the horizontal direction of the display is 30 degrees, and the diameter of the exit pupil 25 is 4.5 mm, the thickness of a region in the prism member 14 through which the light travels is about 5 mm, and thus, it is possible to reduce the thickness of the prism member 14, i.e., the ocular optical element 13. In this way, by utilizing refraction by the eye-side flat surface, it is possible to greatly deflect the light entering from the outside of the face, while reducing the mirror protrusion amount D of the ocular optical element 13 in the visual axis axo direction. Thus, the relay optical system 12 arranged along the side of the face, as illustrated in FIG. 2, can be achieved.

Furthermore, in order to reduce the mirror protrusion amount D of the ocular optical element 13 in the visual axis axo direction, it is preferable to decrease the inclination angle of the surface 14a, that is an eye-side flat surface. However, for example, when the inclination angle of the surface 14a is too small, for example 5 degrees, it is difficult to achieve large deflection, even when the image light G is greatly refracted by the surface 14a and as a result, the image light G may be partially irradiated on the side of the face, and thus, some part of the virtual image may not be displayed. Thus, the inclination angle of the surface 14a, that is an eye-side flat surface, is preferably set to an angle greater than or equal to 5 degrees and less than 20 degrees, and more preferably an angle greater than or equal to 10 degrees and less than 15 degrees.

As described above, it is possible to reduce the mirror protrusion amount D by using the ocular optical element 13. As a result, the thickness of a member in front of the eye ME of the observer can be reduced to improve the appearance design of the head-mounted display 1000.

Note that the ocular optical element 13 is not limited to an element including the prism member 14 and the concave surface mirror 15 as used in the present exemplary embodiment, and may be any type of mirror which can deflect (reflect) the image light G emitted from the image display element 11 and passed through the relay optical system 12 to guide the image light G to the right eye ME of the observer. Thus, the ocular optical element 13 may include a hologram mirror, a Fresnel mirror, or the like, for example.

The relay optical system 12 is configured to guide, along the side of the head of the observer, the image light G emitted from the image display element 11 to (or to make the image light G incident on) the ocular optical element 13. In the present exemplary embodiment, the relay optical system 12 is disposed on the right side surface of the head of the observer and between the image display element 11 and the ocular optical element 13 positioned on the optical path along which the image light G travels. The image light G from the image display element 11 is transmitted through the relay optical system 12, and then emitted to the ocular optical element 13. The relay optical system 12 includes at least positive power and negative power, and the optical system as a whole has positive power. Thus, as the image light G is passed through the relay optical system 12, the relay optical system 12 focuses the image light G emitted from the image display element 11 to form the intermediate image F in front of the ocular optical element 13.

The relay optical system 12 according to the present exemplary embodiment includes a first lens 12a, a second lens 12b, a third lens 12c, a fourth lens 12d, and a prism 12e, which are arranged in this order from the light-entering side (the image display element 11) on the optical path along which the image light G travels to the light-emitting side (the ocular optical element 13 side), and along the right side surface of the head of the observer. Note that, in the present exemplary embodiment, the relay optical system 12 includes the prism 12e that is located at the end on the light-emitting side (the ocular optical element 13 side) on the optical path along which the image light G travels and the four lenses, i.e., the first lens 12a, the second lens 12b, the third lens 12c, and the fourth lens 12d, and however, it is enough for the relay optical system 12 to include the prism 12e and at least one lens. Thus, the number of the lenses is not especially limited to four, and the relay optical system 12 may include one or more lenses.

The prism 12e (light deflecting element) is disposed closest to the ocular optical element 13 in the relay optical system 12 (final stage), and, similarly to the prism member 14, includes an optical medium such as an optical resin or an optical glass which is optically transparent, for example.

The prism 12e as a whole is in a shape of cuboid which is long in the Z direction, and includes an incident surface 121 (surface on the image display element 11 side), an emission surface 122 (surface on the ocular optical element 13 side), a reflecting surface 123 (surface facing away from the side of the head), and an opposite surface 124 (surface facing the side of the head). In the prism 12e having such a configuration, the incident surface 121 and the emission surface 122 are formed opposite each other, the incident surface 121 is on the image display element 11 side, and the emission surface 122 is on the ocular optical element 13 side. In addition, the reflecting surface 123 and the opposite surface 124 are formed opposite each other, the reflecting surface 123 is on a side facing away from the side of the head, and the opposite surface 124 is on a side facing the side of the head. Furthermore, the incident surface 121 includes a first bending surface (first refracting surface) formed as a bending surface (convex) in a protruding form, the emission surface 122 includes a second bending surface (second refracting surface) formed as a bending surface in a protruding form, and the reflecting surface 123 and the opposite surface 124 include a flat surface formed as a planar surface.

In the prism 12e having such a configuration, the image light G emitted from the image display element 11 is incident on the incident surface 121 after traveling through the lens 12d, and then the image light G is reflected on the reflecting surface 123 toward the emission surface 122. Then, the reflected image light G is emitted from the emission surface 122 to the ocular optical element 13.

By the way, in order to arrange, into a form along the side of the head of the observer, the relay optical system 12 included in the image display unit 110A, the image light G traveling (emitted) from the image display element 11 disposed on the side of the head toward a region in front of the face should be deflected such that the image light G is redirected to the ocular optical element 13 disposed in front of the eye of the observer. In this regard, the prism 12e included in the relay optical system 12 achieves such deflection by reflecting the image light G toward the emission surface 122 by using the reflecting surface 123, as described above.

By the way, regarding the deflection of the image light G, it can be considered that a mirror capable of reflecting light is disposed at the same position as the reflecting surface 123, however, in this case, there is a problem of limited degree of freedom of aberration correction since the reflection (deflection) occurs on a single mirror. Especially, when refraction at a large angle occurs by the surface 14a (eye-side flat surface) of the prism member 14, as in the present exemplary embodiment, significant aberration occurs. Thus, it is desirable to provide the prism 12e closest to the ocular optical element 13 in the relay optical system 12 with more powerful aberration correction ability.

In order to comply with such a demand, the prism 12e includes, in addition to the reflecting surface 123, the first bending surface (first refracting surface) included in the incident surface 121 and the second bending surface (second refracting surface) included in the emission surface 122, and thus, these two refracting surfaces can be used for aberration correction. Therefore, it is possible to keep a high degree of freedom of aberration correction, and as a result, more powerful aberration correction ability can be achieved. Thus, the observer can visually recognize a high resolution and less distorted enlarged virtual image through the ocular optical element 13.

Note that, in the present exemplary embodiment, the reflecting surface 123 is a flat surface to avoid disturbance in the wavefront of the image light G, because the image light G is obliquely incident on the reflecting surface 123 and thus the image light G is incident on a wide area. However, the reflecting surface 123 is not limited to a surface including a flat surface and may include a bending surface capable of aberration correction of the optical system.

Further, in the present exemplary embodiment, the image light G incident from the incident surface 121 of the prism 12e is incident on the reflecting surface 123 at an angle equal to or greater than a critical angle. Thus, the image light G is totally reflected on the reflecting surface 123. Thus, the reflecting surface 123 may not include a reflecting film (mirror) such as a metal film formed thereon. In this case, when the opposite surface 124 is parallel to the reflecting surface 123, as in the present exemplary embodiment, it is possible to visually recognize the external environment (outside) view through the prism 12e. In addition, it is possible to receive light from the external environment, and thus the observer wearing the head-mounted display 1000 can feel a sense of openness. In the configuration in which total reflection occurs on the reflecting surface 123, which is a flat surface extending in the Z direction, i.e., along the side of the head, the prism 12e in which the incident surface 121 does not intersect the emission surface 122 can be formed, thereby it is possible to reduce the thickness of the prism 12e. In other words, it is possible to provide a compact and light weight prism 12e. Therefore, the protrusion amount in the Y direction, i.e., the protrusion amount from the head can be reduced, and thus it is possible to provide the head-mounted display 1000 with excellent appearance.

Furthermore, the opposite surface 124 at a position opposing to the reflecting surface 123 includes a flat surface and is provided so as to be parallel to the reflecting surface 123. The prism 12e including the opposite surface 124 in such a way allows for simplification of manufacturing process of the prism 12e, because the prism 12e can be provided by forming, on surfaces of opposite edges of a parallel surface plate having the reflecting surface 123 and the opposite surface 124 preformed therein, bending surfaces (refracting surfaces) to make the incident surface 121 and the emission surface 122. Note that, apart from the above-described manufacturing method, the prism 12e can be also manufactured by bonding a member including the incident surface 121 formed therein and a member including the emission surface 122 formed therein onto respective surfaces of opposite edges of a parallel surface plate having the reflecting surface 123 and the opposite surface 124 preformed therein.

In the above-described image display unit 110A including the image display element 11, the relay optical system 12, and the ocular optical element 13, the surface shapes of the lenses 12a to 12d and the prism 12e included in the relay optical system 12, and the surface shape of the surface 14b (light reflecting surface) of the prism member 14 included in the ocular optical element 13 are formed into curved surfaces expressed by XY polynomial expressions. The image display unit 110A is considerably asymmetrical in the horizontal direction (Y direction) and vertically symmetrical in the vertical direction (X direction), and thus all x terms in the XY polynomial expressions are even-order terms.

As described above, according to the invention, in the image display unit 110A (head-mounted display 1000) including the image display element 11 configured to emit the image light G, the relay optical system 12 configured to generate the intermediate image F of the image light G emitted from the image display element 11, and the ocular optical element 13 configured to reflect the intermediate image F toward a position assumed to be a position of the eye ME of the observer (exit pupil 25) to generate an enlarged virtual image, the relay optical system 12 includes the prism 12e, and the prism 12e includes the first bending surface including a bending surface and serving as the incident surface 121, the second bending surface including a bending surface and serving as the emission surface 122, and the reflecting surface 123 configured to reflect, toward the second bending surface, the image light G incident from the first bending surface.

As a result, it is possible to provide a compact and light weight prism 12e, and thus the relay optical system 12. Therefore, the relay optical system 12 with a reduced protrusion amount can be disposed along the side of the head of the observer (user). Therefore, it is possible to provide the head-mounted display 1000 including the relay optical system 12 with excellent appearance.

Furthermore, three surfaces in the prism 12e, i.e., the incident surface 121, the emission surface 122 and the reflecting surface 123 are available for aberration correction, and thus it is possible to keep a high degree of freedom of aberration correction. As a result, more powerful aberration correction can be performed, and the observer can visually recognize a high resolution and less distorted enlarged virtual image through the ocular optical element 13.

Therefore, it is possible to provide the head-mounted display 1000 having excellent appearance achieved by reducing the protrusion amount from the head of the observer, and allowing for visual recognition of a high resolution, less distorted and large image (virtual image).

Second Exemplary Embodiment

Next, Second Exemplary Embodiment of the image display unit 110A will be described.

Figure 6:
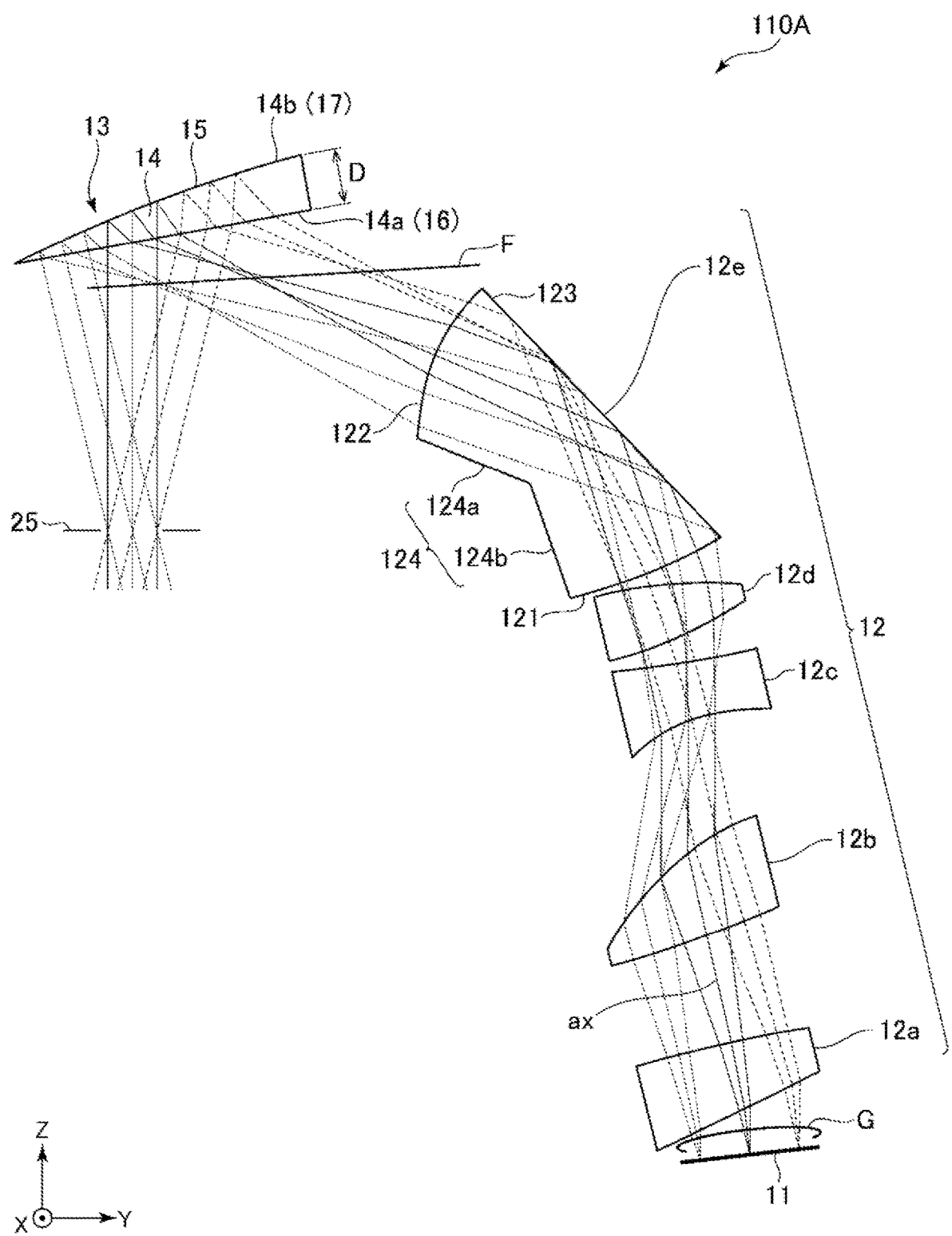
FIG. 6 is an enlarged plan view of an arrangement in the right section of Second Exemplary Embodiment of the image display unit included in the HMD.

FIG. 6 is an enlarged plan view of an arrangement in the right section of Second Exemplary Embodiment of the image display unit included in the HMD.

The following description for the image display unit 110A according to Second Exemplary Embodiment is focused on difference with respect to the image display unit 110A according to First Exemplary Embodiment, and description of similar features will be omitted.

The image display unit 110A according to Second Exemplary Embodiment, as illustrated in FIG. 6, is similar to the image display unit 110A according to First Exemplary Embodiment, except that the opposite surface 124 included in the prism 12e includes two flat surfaces 124a and 124b.

In the prism 12e, the image light G is incident from the incident surface 121, reflected on the reflecting surface 123, and then emitted from the emission surface 122 and travels toward the ocular optical element 13. Herein, it is not necessary to form, by a prism, a region within the prism 12e which is not involved in the propagation of the image light G. In other words, a prism medium is not needed for such a region.

Thus, in the present exemplary embodiment, as illustrated in FIG. 6, the opposite surface 124 at a position opposing to the reflecting surface 123 is divided into two surfaces, and includes a flat surface 124a and a flat surface 124b. Herein, the opposite surface 124 is formed as a concave surface formed by the two flat surfaces 124a and 124b and the thickness of the prism 12e gradually decreases in directions from two edges of the prism 12e in the Z direction toward the center of the prism 12e.

The prism 12e in such configuration allows for a light weight relay optical system 12 and a reduction of the thickness of the prism 12e, and thus the relay optical system 12 can be disposed more conformably along the side of the head of the observer.

The image display unit 110A according to Second Exemplary Embodiment can also provide benefit similar to that of First Exemplary Embodiment.

Third Exemplary Embodiment

Next, Third Exemplary Embodiment of the image display unit 110A will be described.

Figure 7:
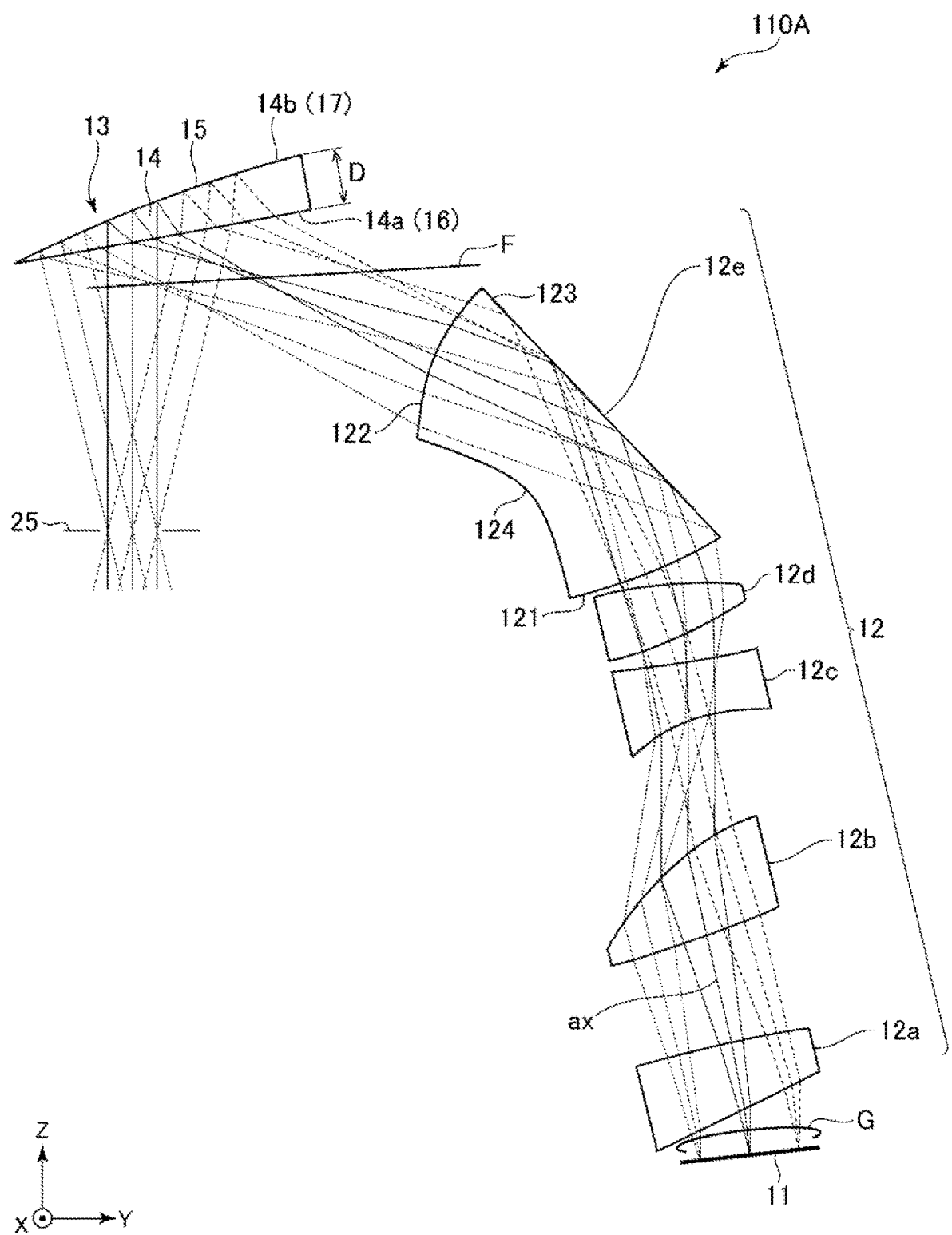
FIG. 7 is an enlarged plan view of an arrangement in the right section of Third Exemplary Embodiment of the image display unit included in the HMD.

FIG. 7 is an enlarged plan view of an arrangement in the right section of Third Exemplary Embodiment of the image display unit included in the HMD.

The following description for the image display unit 110A according to Third Exemplary Embodiment is focused on difference with respect to the image display unit 110A according to First Exemplary Embodiment, and description of similar features will be omitted.

The image display unit 110A according to Third Exemplary Embodiment, as illustrated in FIG. 7, is similar to the image display unit 110A according to First Exemplary Embodiment, except that the opposite surface 124 included in the prism 12e includes a curved surface.

In the prism 12e, the image light G is incident from the incident surface 121, reflected on the reflecting surface 123, and then emitted from the emission surface 122 and travels toward the ocular optical element 13. Herein, it is not necessary to form, by a prism, a region within the prism 12e which is not involved in the propagation of the image light G. In other words, a prism medium is not needed for such a region.

Thus, in the present exemplary embodiment, as illustrated in FIG. 7, the opposite surface 124 at a position opposing to the reflecting surface 123 includes a curved surface, i.e., a curved concave surface, which is formed by the prism 12e the thickness of which gradually decreases in directions from two edges of the prism 12e in the Z direction toward the center of the prism 12e.

The prism 12e in such configuration allows for a light weight relay optical system 12 and a reduction of the thickness of the prism 12e, and thus the relay optical system 12 can be disposed more conformably along the side of the head of the observer.

The image display unit 110A according to Third Exemplary Embodiment can also provide benefit similar to that of First Exemplary Embodiment.

Fourth Exemplary Embodiment

Next, Fourth Exemplary Embodiment of the image display unit 110A will be described.

Figure 8:
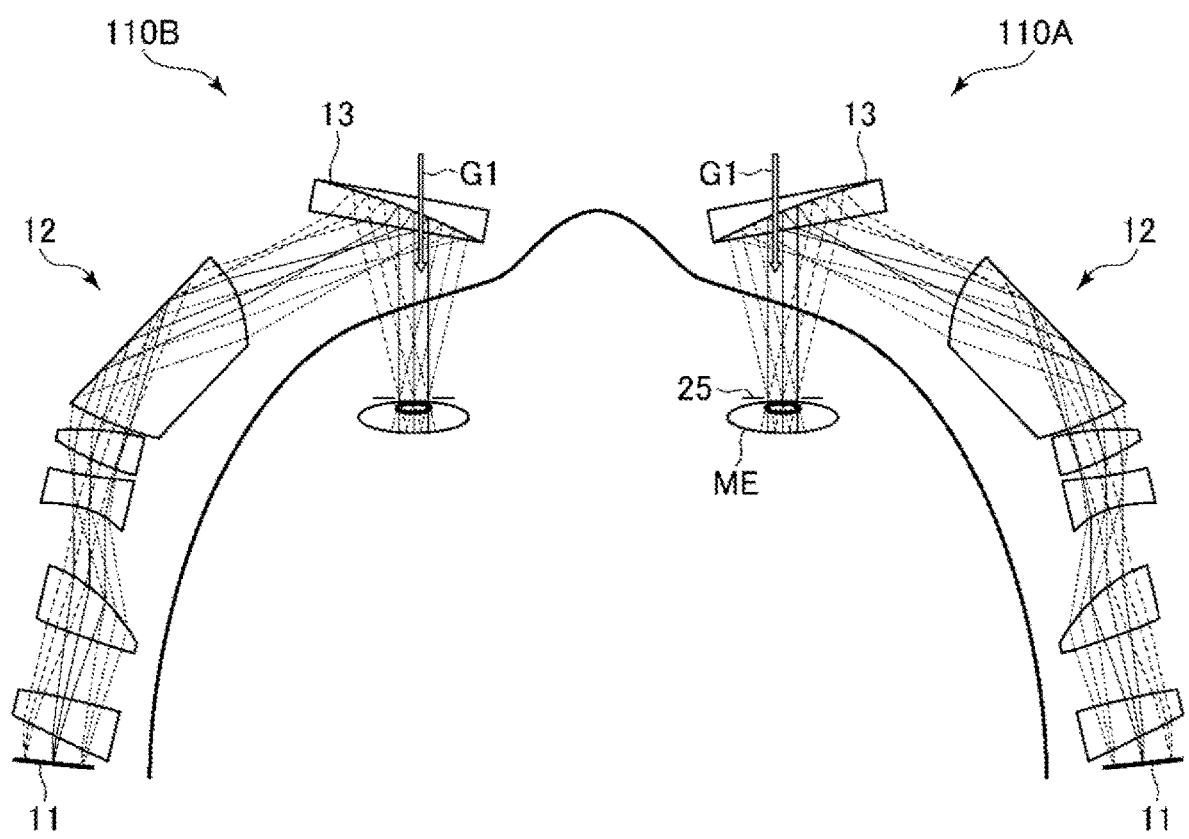
FIG. 8 is a schematic plan view generally illustrating a configuration of Fourth Exemplary Embodiment of an image display unit included in the head-mounted display illustrated in FIG. 1, in which the HMD is mounted on the observer.
Figure 9:
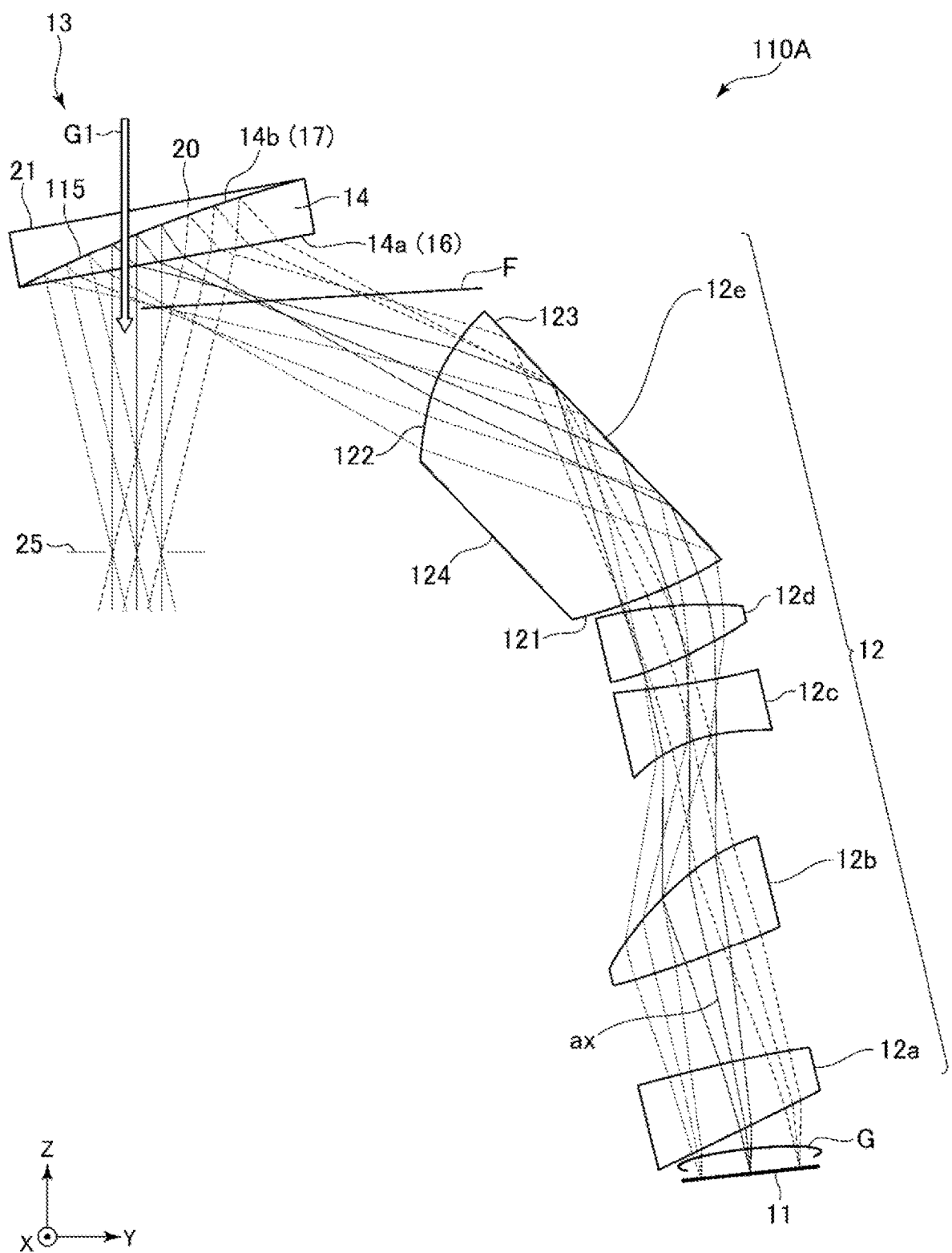
FIG. 9 is an enlarged plan view of an arrangement in the right section of the image display unit illustrated in FIG. 8.

FIG. 8 is a schematic plan view generally illustrating a configuration of Fourth Exemplary Embodiment of an image display unit included in the head-mounted display illustrated in FIG. 1, in which the HMD is mounted on the observer. FIG. 9 is an enlarged plan view of an arrangement in the right section of the image display unit illustrated in FIG. 8.

The following description for the image display unit 110A according to Fourth Exemplary Embodiment is focused on difference with respect to the image display unit 110A according to First Exemplary Embodiment, and description of similar features will be omitted.

The image display unit 110A according to Fourth Exemplary Embodiment, as illustrated in FIGS. 8 and 9, is similar to the image display unit 110A according to First Exemplary Embodiment, except for difference in configuration of the ocular optical element 13 (prism optical element).

Note that the image display unit 110A according to First Exemplary Embodiment is applied to a reflective type HMD, as described above, while the image display unit 110A according to the present exemplary embodiment is applied to a so-called see-through type HMD superimposing the image light G onto the external environment.

In the image display unit 110A according to the present exemplary embodiment, as illustrated in FIG. 9, the ocular optical element 13 includes a prism member 14, a prism member 20 (second prism member), and a concave surface mirror 115.

The concave surface mirror 115 includes a partially reflecting film. An example of the partially reflecting film is a half mirror. Examples of the half mirror include a thin metal film which is formed into an extremely thin metal film configured to transmit a part of the intensity of the image light G (incident light), and the like.

Note that the thin metal film forming the half mirror significantly absorbs light. Thus, the concave surface mirror 115 may be formed by a dielectric multilayer film. In this case, the concave surface mirror 115 is configured as an amplitude division type reflecting film and can effectively reflect the image light G.

Furthermore, it is possible to use, as the concave surface mirror 115, a volume hologram layer configured to reflect (diffract) light having a specific wavelength. In this case, the concave surface mirror 115 is configured as a wavelength division type reflecting film and can effectively reflect light within a desirable wavelength range included in the image light G.

The prism member 20 is opposite to the prism member 14, and the concave surface mirror 115 is positioned between the prism member 20 and the prism member 14. For example, the prism member 20 includes an optically transparent optical resin or optical glass, as in the prism member 14, and has a refractive index substantially equal to that of the prism member 14.

The prism member 20 includes an outside light refracting surface 21 (second light refracting surface) including a flat surface, and the outside light refracting surface 21 is parallel to the light refracting surface 16 opposite from the concave surface mirror 115.

Herein, when only the prism member 14 is disposed in front of the eye ME of the observer (user), as in First Exemplary Embodiment, external environment (outside view) visually recognized by the observer through the prism member 14 may be distorted. In contrast, the present exemplary embodiment in which the prism member 20 is disposed on the external environment side with respect to the concave surface mirror 115 allows for compensation of the optical path of light from the external environment, thereby appropriately suppressing or preventing distortion in the external environment view.

More specifically, the refractive index of the optical resin on the eye ME side with respect to the concave surface mirror 115 (prism member 14) is substantially equal to the refractive index of the optical resin on the external environment side (prism member 20), as described above, thereby refraction of light by the curved surface 17 of the prism member 14 is prevented.

Especially, as described in First Exemplary Embodiment, when a large virtual image having a horizontal angle of view of about 40 degrees is observed, the mirror protrusion amount D of the ocular optical element 13 is about 10 mm. When the external environment is observed through such thick prism member 14, the see-through image G1 tends to be distorted.

In contrast, in the ocular optical element 13 according to the present exemplary embodiment, each of the light refracting surface 16 serving as an incident surface of light from the external environment and the outside light refracting surface 21 serving as a light-emission surface includes a flat surface, and these flat surfaces are parallel to each other. Thus, there is no difference between the angle of the ray of light entering the ocular optical element 13 from the external environment and the angle of the ray of light emitted after refraction by the ocular optical element 13. Therefore, the observer wearing the head-mounted display 1000 can observe a non-distorted external environment view (see-through image G1 illustrated in FIGS. 8 and 9) through the concave surface mirror 115. Thus, it is possible to reduce tiredness and uncomfortable feeling in the observer during use.

Therefore, the head-mounted display 1000 including the image display unit 110A according to the present exemplary embodiment allows an observer to visually recognize the image light G from the image display element 11 superimposed onto a non-distorted see-through image G1.

Note that when some degree of refraction causing unrecognizable distortion in the external environment view is acceptable in the concave surface mirror 115, the refractive index of the optical resin on the eye ME side (prism member 14) and the refractive index of the optical resin on the external environment side (prism member 20) may not be necessarily equal, and they may be slightly different.

The image display unit 110A according to Fourth Exemplary Embodiment can also provide benefit similar to that of First Exemplary Embodiment.

Fifth Exemplary Embodiment

Next, Fifth Exemplary Embodiment of the image display unit 110A will be described.

Figure 10:
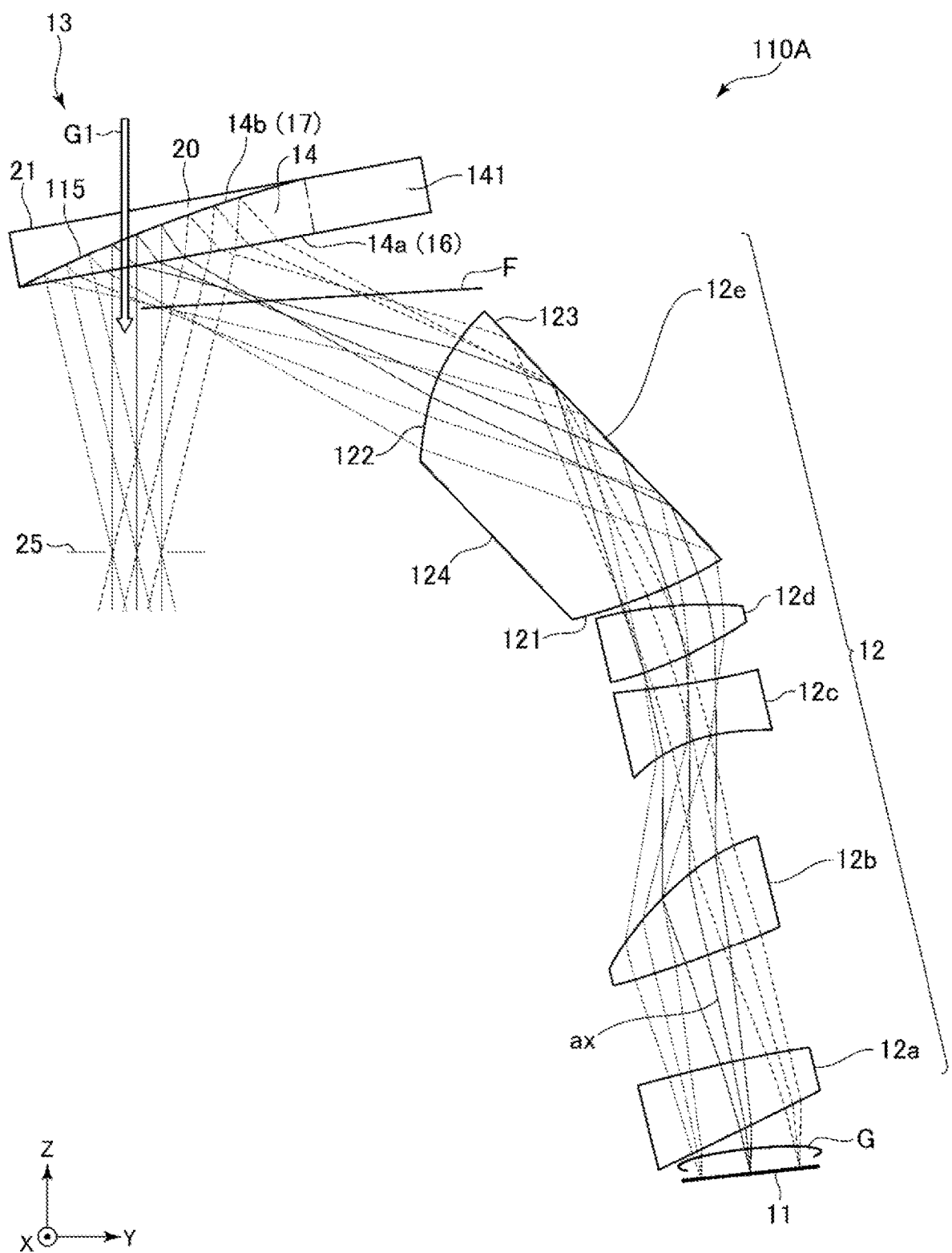
FIG. 10 is an enlarged plan view of an arrangement in the right section of Fifth Exemplary Embodiment of the image display unit included in the HMD.
Figure 11:
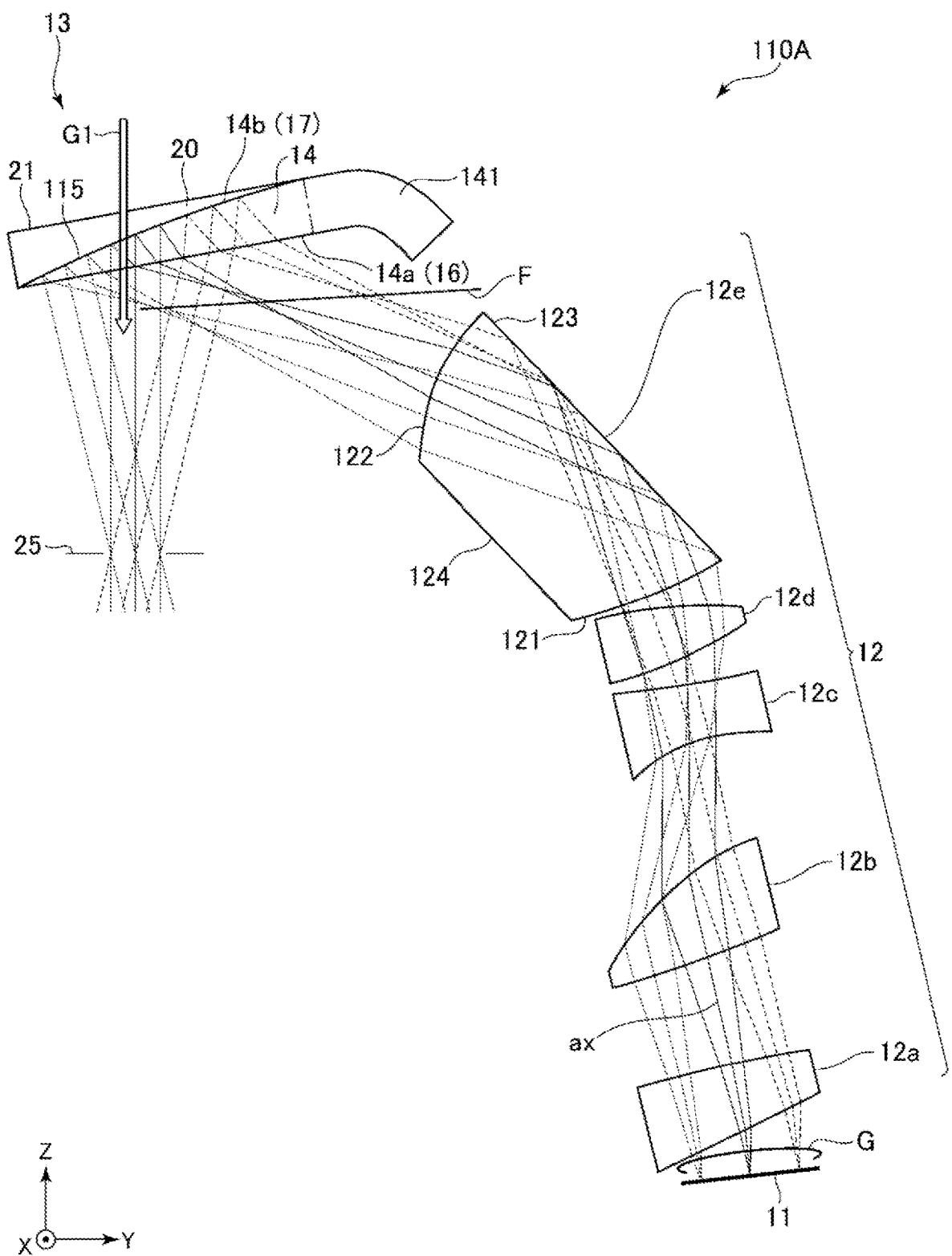
FIG. 11 is an enlarged plan view of another arrangement example in the right section of the image display unit of Fifth Exemplary Embodiment illustrated in FIG. 10.

FIG. 10 is an enlarged plan view of an arrangement in the right section of Fifth Exemplary Embodiment of the image display unit included in the HMD and FIG. 11 is an enlarged plan view of another arrangement example in the right section of the image display unit of Fifth Exemplary Embodiment illustrated in FIG. 10.

The following description for the image display unit 110A according to Fifth Exemplary Embodiment is focused on difference with respect to the image display unit 110A according to Fourth Exemplary Embodiment, and description of similar features will be omitted.

The image display unit 110A according to Fifth Exemplary Embodiment, as illustrated in FIG. 10, is similar to the image display unit 110A according to Fourth Exemplary Embodiment, except for difference in configuration of the ocular optical element 13 (prism optical element).

According to the image display unit 110A of the present exemplary embodiment, as illustrated in FIG. 10, the parallel surface structure in the prism member 14 of the ocular optical element 13, which includes the outside light refracting surface 21 and the light refracting surface 16, extends beyond the region in which the concave surface mirror 115 (prism member 20) is formed and outward (in the Y direction) which is a direction away from the nose of the observer, and thereby the prism member 14 includes a cuboid shaped extension 141 (protrusion).

When the prism member 14 (the ocular optical element 13) includes the extension 141 in such a manner, the extension 141 protruding in the lateral direction (Y direction) allows appropriate reduction or prevention of recognition of the edge of the ocular optical element 13 having a plate structure, by an observer watching external environment through the ocular optical element 13. In other words, it is possible to appropriately suppress or prevent obstructing view of the observer.

Note that the shape of the extension 141 is not limited to a parallel surface plate shape (cuboid shape), as illustrated in FIG. 10, the extension 141 may have a curved shape in which a plate is curved toward the relay optical system 12, as in another configuration example illustrated in FIG. 11. As a result, it is possible to reduce the mirror protrusion amount D of the ocular optical element 13.

Furthermore, when the thickness of the ocular optical element 13 is about 5 mm, the extending width of the extension 141 (protrusion amount) is preferably from about 10 mm to about 40 mm, and more preferably from about 15 mm to about 30 mm. As a result, it is possible to reduce the mirror protrusion amount D of the ocular optical element 13 and to ensure the benefit given by forming the extension 141.

The image display unit 110A according to Fifth Exemplary Embodiment can also provide benefit similar to that of First Exemplary Embodiment.

The virtual image display device of the present invention was described above based on the illustrated exemplary embodiments, however the invention is not limited thereto.

For example, in the virtual image display device of the invention, any of constitute elements may be replaced with any element capable of exhibiting similar functionality or an element in any configuration may be added.

For example, in the invention, any two or more constitute elements described in above-described First to Fifth Exemplary Embodiments may be combined.

Furthermore, in all the virtual image display devices according to the exemplary embodiments described above, the image display element is disposed on the side of the head of the observer, and image light generated in the image display element travels through the relay optical system disposed on the side of the head of the observer and between the image display element and the ocular optical element, and is emitted to the ocular optical element disposed in front of the eye of the observer, however the virtual image display device according to the invention is not limited to such a configuration. Therefore, the image display element may be disposed on the top of the head of the observer, and the relay optical system may be disposed on the top of the head of the observer and between the image display element and the ocular optical element, such that the image light generated in the image display element and traveling through the relay optical system is emitted to the ocular optical element disposed in front of the eye of the observer.

Furthermore, the virtual image display device (image display device) of the invention applied to a head-mounted display (HMD) was exemplified in the above-described exemplary embodiment, however the virtual image display device of the invention is not limited thereto. Therefore, the virtual image display device of the invention may also be applied to a head-up display fixed to an object or a binocular type handheld display.

The entire disclosure of Japanese Patent Application No. 2018-031372, filed Feb. 23, 2018 is expressly incorporated by reference herein.

What is claimed is:

1. A virtual image display device, comprising:
an image display element configured to emit image light;
a relay optical system configured to generate an intermediate image of the image light emitted from the image display element; and
an ocular optical element configured to reflect the intermediate image toward a position assumed to be a position of an eye of an observer to generate an enlarged virtual image, wherein
the relay optical system includes a prism, the prism including
a first bending surface including a bending surface and serving as an incident surface,
a second bending surface including a bending surface and serving as an emission surface, the first bending surface and the second bending surface opposing each other without intersecting each other, and
a reflecting surface configured to reflect, toward the second bending surface, the image light incident from the first bending surface.

2. The virtual image display device according to claim 1, wherein
the relay optical system further includes at least one lens, and the prism is positioned closest to the ocular optical element in the relay optical system.

3. The virtual image display device according to claim 1, wherein
the image display element is disposed at a position assumed to be a position of a side of a head of the observer,
the ocular optical element is disposed at a position assumed to be a position in front of the eye of the observer,
the relay optical system is disposed between the image display element and the ocular optical element, and
the image display element is configured to emit the image light along the position assumed to be the position of the side of the head to make the image light incident on the relay optical system.

4. The virtual image display device according to claim 1, wherein
the reflecting surface includes a flat surface.

5. The virtual image display device according to claim 1, wherein
the prism includes an opposite surface at a position opposing to the reflecting surface, the opposite surface including a flat surface.

6. The virtual image display device according to claim 1, wherein
the prism includes an opposite surface at a position opposing to the reflecting surface, the opposite surface being a concave surface including two flat surfaces.

7. The virtual image display device according to claim 1, wherein
the prism includes an opposite surface at a position opposing to the reflecting surface, the opposite surface including a curved concave surface.

8. The virtual image display device according to claim 1, wherein
the ocular optical element includes
a prism member including a transparent optical medium and
a concave surface mirror covering a part of the prism member,
the prism member includes
a flat surface facing the position assumed to be the position of the eye of the observer, and
a curved surface on an opposite side with respect to the position assumed to be the position of the eye, the curved surface including a protruding curved surface shape protruding away from the flat surface facing the position assumed to be the position of the eye, and
the concave surface mirror covers the curved surface.

* * * * *